United States Patent [19]

Dalibard et al.

[11] 4,253,871

[45] Mar. 3, 1981

[54] ALLOYS FOR MAKING ELECTRODE SUPPORTS IN LEAD ACCUMULATORS

[75] Inventors: Gerard Dalibard, Sevres; Nicole Viaud, Ville d'Avray, both of France

[73] Assignee: Compagnie Europeenne d'Accumulateurs, Paris, France

[21] Appl. No.: 56,937

[22] Filed: Jul. 12, 1979

[30] Foreign Application Priority Data

Jul. 20, 1978 [FR] France .................... 78 21502

[51] Int. Cl.$^3$ .............................................. H01M 4/38
[52] U.S. Cl. ................................. 75/166 B; 429/245
[58] Field of Search ...................... 429/245; 75/166 B

[56] References Cited

U.S. PATENT DOCUMENTS

| | | | |
|---|---|---|---|
| 3,113,020 | 12/1963 | Larsen | 75/135 |
| 3,912,537 | 10/1975 | Peters | 136/26 |
| 4,008,079 | 2/1977 | Bowers | 75/134 T |

FOREIGN PATENT DOCUMENTS 37-5552  6/1962  Japan ................................. 75/166 B

*Primary Examiner*—L. Dewayne Rutledge
*Assistant Examiner*—Upendra Roy
*Attorney, Agent, or Firm*—Haseltine and Lake

[57] ABSTRACT

Low antimony alloys of lead are used for casting electrode supports in lead accumulators. They include less than 4% antimony by weight to avoid various poisoning effects of antimony on the electrochemical processes involved. Such alloys tend to have grains of excessive size which can lead to brittle castings. To reduce the grain size the present invention includes an additive constituted by a rare earth or a mixture of rare earths, e.g. misch metal at between 0.001% and 1% by weight, and preferably at 0.2%. The invention also provides an electrode support cast from the alloy, an electrode including such a support and a lead acid battery including such electrodes.

6 Claims, No Drawings

ALLOYS FOR MAKING ELECTRODE SUPPORTS IN LEAD ACCUMULATORS

The present invention relates to low antimony alloys for making electrode supports in lead accumulators. The main constituent of these alloys is lead and they include less than 4% antimony by weight. Indeed they may contain no antimony at all. Various other additives, e.g. 0.2% tin, are generally included in small percentages for various well known specific purposes, and the combined total weight of these additives rarely exceeds 2%.

Antimony is often included in lead alloys for electrodes since it tends to improve the use made of the active materials, particularly during cycling. However, its concentration is kept below 4% in order to avoid problems with self discharging and low hydrogen overpressure.

The applicant has observed that a problem with electrode supports cast from low antimony alloys, and particularly those in the form of grids, is that they may be brittle due to cracking. This cracking seems to be due to the large grain size of low antimony alloys.

Attempts have been made to reduce the grain size by introducing sulfur, selenium or tellurium in these alloys. But the results obtained have not been conclusive, since the addition of such materials while certainly providing a degree of fining, is difficult; partially because of their low solubility in the lead-antimony alloys concerned, but especially because they give rise to substantial irregularities in the shapes and sizes of the grains, thereby still leading to cracking phenomena.

Furthermore, the use of temperatures in the region of 450° C. during the making of such alloys, paarticularly when using sulphur, leads to the emission of polluting lead vapour.

The present invention aims to provide other means of reducing grain size in an attempt to mitigate the problem of brittle electrode supports and support grids.

The present invention provides a lead-antimony alloy containing less than 4% antimony by weight and intended for use in manufacturing supports for the electrodes of lead accumulators, wherein it further includes an additive constituted by a rare earth or a mixture of rare earths, the concentration of the said additive lying between 0.001 and 1%.

It should be observed that up to now, a rare earth or mixture of rare earths has not been added to lead alloys for the purpose of reducing cracking phenomena in supports, e.g. grids, made from the said alloys.

Preferably, the said additive is misch metal, comprising a mixture of cerium, lanthanum, neodymium and praseodymium, e.g. 50% cerium, 25% lanthanum 20% neodymium, and 5% praseodymium.

The concentration of misch metal may be about 0.2%.

The use of such an additive makes it possible to multiply the number of domains or grains per unit area by about 400, whereas sulfur can only obtain a multiplication factor of about 50.

The rare earth additive may be used in conjunction with sulfur, selenium or tellurium, but preferably it is used without sulfur since it is then possible to obtain such lead-antimony-rare earth alloys at temperatures of around 400° C., which, when compared with sulfur, leads both to an energy saving and to a reduction in pollution.

Alloys in accordance with the invention are prepared by introducing the rare earth into soft lead in a first step followed by the addition of the antimony. The invention supposes that the other usual additives are added in the usual manner as required.

Naturally the invention also provides electrode supports constituted by the above-defined alloys, electrodes comprising such supports, and lead accumulators comprising such electrodes.

We claim:

1. A lead-antimony alloy containing less than 4% antimony by weight and intended for use in manufacturing supports for the electrodes of lead accumulators, further comprising a mixture of rare earths, the concentration of the said mixture lying between 0.001 and 1%.

2. An alloy according to claim 1, wherein the said mixture is misch metal.

3. An alloy according to claim 2, wherein the concentration of misch metal is about 0.2% by weight.

4. An electrode support constituted by an alloy according to claim 1.

5. An electrode comprising supports according to claim 4.

6. An accumulator comprising electrodes according to claim 5.

* * * * *